United States Patent
Greenhalgh (10) Patent No.: US 10,049,043 B2
(45) Date of Patent: Aug. 14, 2018

(54) FLUSHING CONTROL WITHIN A MULTI-THREADED PROCESSOR

(71) Applicant: ARM LIMITED, Cambridge (GA)

(72) Inventor: Peter Richard Greenhalgh, Cambridge (GB)

(73) Assignee: ARM Limited, Cambridge (GB)

(*) Notice: Subject to any disclaimer, the term of this patent is extended or adjusted under 35 U.S.C. 154(b) by 154 days.

(21) Appl. No.: 15/152,775

(22) Filed: May 12, 2016

(65) Prior Publication Data

US 2016/0357669 A1    Dec. 8, 2016

(30) Foreign Application Priority Data

Jun. 2, 2015 (GB) .................. 1509484.0

(51) Int. Cl.
*G06F 12/08* (2016.01)
*G06F 12/0804* (2016.01)
*G06F 12/0811* (2016.01)
*G06F 12/0875* (2016.01)
*G06F 9/38* (2018.01)
*G06F 9/46* (2006.01)

(52) U.S. Cl.
CPC ........ *G06F 12/0804* (2013.01); *G06F 9/3824* (2013.01); *G06F 9/3851* (2013.01); *G06F 9/3861* (2013.01); *G06F 9/46* (2013.01); *G06F 12/0811* (2013.01); *G06F 12/0875* (2013.01); *G06F 2212/1021* (2013.01); *G06F 2212/452* (2013.01); *G06F 2212/60* (2013.01); *G06F 2212/62* (2013.01)

(58) Field of Classification Search
CPC ............. G06F 12/0804; G06F 12/0811; G06F 12/0875; G06F 9/3851; G06F 9/46; G06F 9/3824; G06F 9/3861; G06F 2212/1021; G06F 2212/60; G06F 2212/62; G06F 2212/452
USPC ........................................... 711/137
See application file for complete search history.

(56) References Cited

U.S. PATENT DOCUMENTS 5,581,727 A * 12/1996 Collins ............... G06F 12/0804
                                                                711/122
6,543,003 B1   4/2003 Floyd et al.
(Continued)

FOREIGN PATENT DOCUMENTS

GB       2538985 A  * 12/2016  ......... G06F 12/0804
WO   WO 2006/083542        8/2006

OTHER PUBLICATIONS

Combined Search and Examination Report for GB1509484.0 dated Dec. 4, 2015, 5 pages.

*Primary Examiner* — Pierre Miche Bataille
(74) *Attorney, Agent, or Firm* — Nixon & Vanderhye P.C.

(57) ABSTRACT

A data processing apparatus 2 performs multi-threaded processing using the processing pipeline 6, 8, 10, 12, 14, 16, 18. Flush control circuitry 30 is responsive to multiple different types of flush trigger. Different types of flush trigger result in different sets of state being flushed for the thread which resulted in the flush trigger with state for other thread not being flushed. For example, a relatively low latency stall may result in flushing back to a first flush point whereas a longer latency stall results in flushing back to a second flush point and the loss of more state data. The data flushed back to the first flushed point may be a subset of the data flushed back to the second flush point.

18 Claims, 4 Drawing Sheets

(56) References Cited

U.S. PATENT DOCUMENTS

| | | | |
|---|---|---|---|
| 6,681,293 B1 * | 1/2004 | Solomon | G06F 12/0811 711/120 |
| 7,437,538 B1 | 10/2008 | Brooks et al. | |
| 2004/0123040 A1 * | 6/2004 | Jung | G06F 12/0804 711/135 |
| 2006/0184769 A1 | 8/2006 | Floyd et al. | |
| 2007/0113055 A1 * | 5/2007 | Dale | G06F 9/3824 712/228 |

* cited by examiner

FLUSHING CONTROL WITHIN A MULTI-THREADED PROCESSOR

This application claims priority to GB Patent Application No. 1509484.0 filed 2 Jun. 2015, the entire content of which is hereby incorporated by reference.

BACKGROUND

Field

This disclosure relates to the field of data processing systems. More particularly, this disclosure relates to multi-threaded data processing systems and the control of flushing within such systems.

Description

It is known to provide data processing systems which utilise multi-threading techniques to improve system performance and efficiency. Different types of multi-threading are known, such as fine grained multi-threading (FGMT) in which instructions from different threads are interleaved in a fine grained manner and are processed in parallel such that instructions from different threads are "in flight" along the processing pipeline at the same time. Other forms of multi-threading are also known, such as simultaneous multi-threading (SMT) in which multiple processing operation from different threads are issued each cycle.

SUMMARY

Viewed from one aspect the present disclosure provides apparatus for processing data comprising:
processing circuitry to execute in parallel processing operations corresponding to a plurality of threads of processing operations; and
flush control circuitry responsive to detection of a flush trigger for a given processing thread among said plurality of threads to control flushing of state for said given thread from said processing circuitry; and
a hierarchical memory having a plurality of memory levels; wherein
said first type of flush trigger corresponds to an access to a first memory level within said plurality of memory levels;
said second type of flush trigger corresponds to an access to a second memory level within said plurality of memory levels and different from said first memory level;
when said flush trigger is said first type of flush trigger, said state is a first set of state; and
when said flush trigger is said second type of flush trigger, said state is a second set of state different from said first set of state.

Viewed from another aspect the present disclosure provides apparatus for processing data comprising:
processing means for executing in parallel processing operations corresponding to a plurality of threads of processing operations; and
flush control means, responsive to detection of a flush trigger for a given processing thread among said plurality of threads, for controlling flushing of state for said given thread from said processing circuitry; and
a hierarchical memory means having a plurality of memory levels; wherein
said first type of flush trigger corresponds to an access to a first memory level within said plurality of memory levels; said second type of flush trigger corresponds to an access to a second memory level within said plurality of memory levels and different from said first memory level;
when said flush trigger is said first type of flush trigger, said state is a first set of state; and
when said flush trigger is said second type of flush trigger, said state is a second set of state different from said first set of state.

Viewed from a further aspect the present disclosure provides a method of processing data comprising:
executing in parallel processing operations corresponding to a plurality of threads of processing operations; and
in response to detection of a flush trigger for a given processing thread among said plurality of threads, controlling flushing of state for said given thread from said processing circuitry; wherein
said first type of flush trigger corresponds to an access to a first memory level within said plurality of memory levels;
said second type of flush trigger corresponds to an access to a second memory level within said plurality of memory levels and different from said first memory level;
when said flush trigger is said first type of flush trigger, said state is a first set of state; and
when said flush trigger is said second type of flush trigger, said state is a second set of state different from said first set of state.

The above, and other objects, features and advantages of this disclosure will be apparent from the following detailed description of illustrative embodiments which is to be read in connection with the accompanying drawings.

EMBODIMENTS

Figure 1:
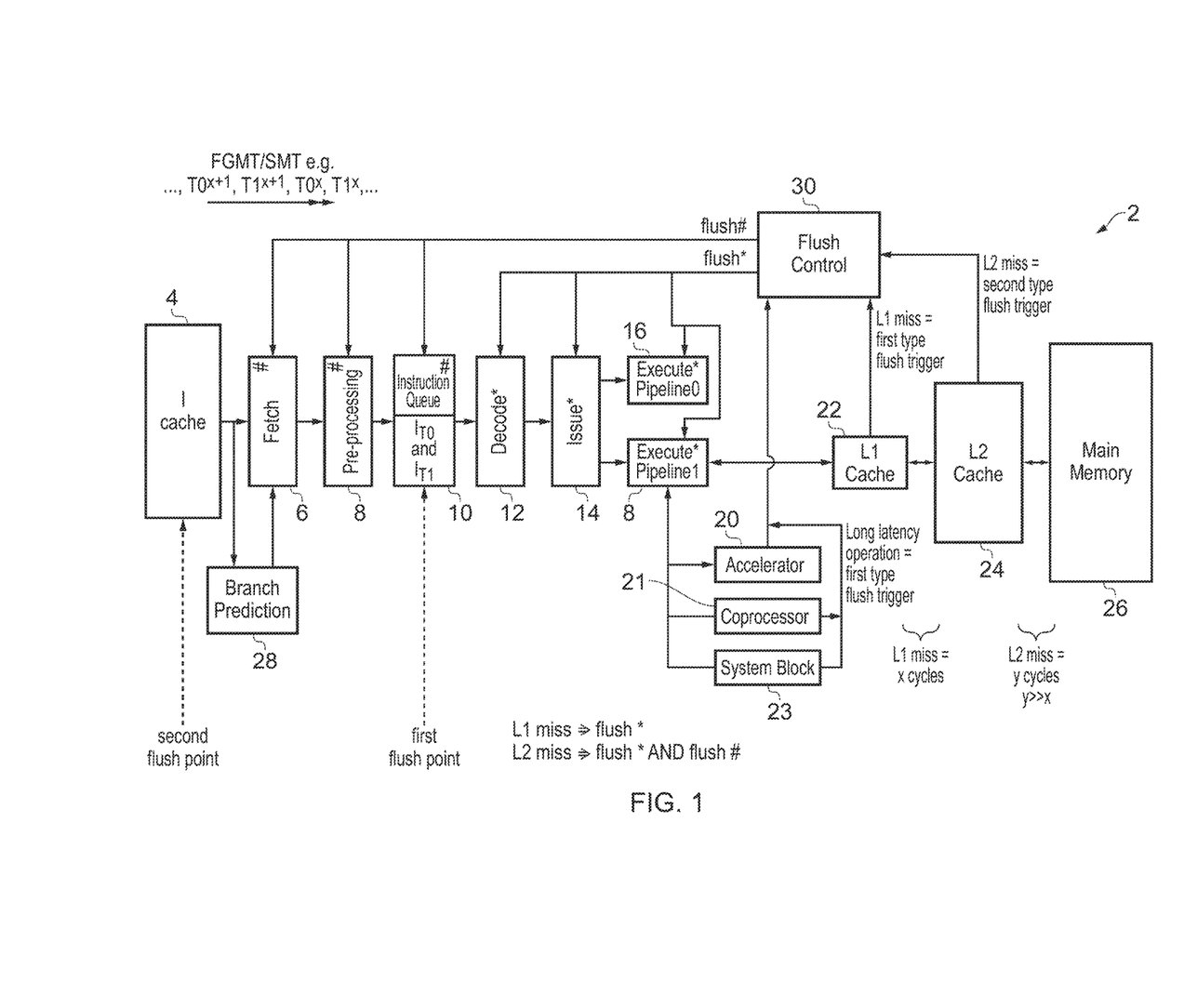
FIG. 1 schematically illustrates a first example processing pipeline.

FIG. 1 schematically illustrates a processing apparatus 2 comprising a processing pipeline for performing, for example, fine grained multi-threaded processing or simultaneous multi-threaded processing. Such multi-threading may, for example, serve to process in parallel two threads of program instructions, such as thread 0 (T0) and thread 1 (T1). In the case of fine-grained multi-threading, instructions from alternating threads are supplied to the processing pipeline, with each thread following its own program flow. The processing apparatus 2 may be an in-order processing apparatus or an out-of-order processing apparatus. In the case of an out-of-order processing apparatus, the individual program instructions may be reordered out of the strict interleaved order in which they are initially supplied to the processing apparatus 2. The out-of-order processing may also operate to keep program instructions interleaved between threads, but reorder the instructions within each thread. Various other possibilities for multi-threaded operation and control will also be apparent to those in this technical field and are encompassed within the present disclosure.

Instructions for execution are stored within an instruction cache 4 from where they are supplied into a processing pipeline including a fetch stage 6, a pre-processing stage 8, an instruction queue 10, a decode stage 12, an issue stage 14 and parallel execution pipelines 16, 18. Accelerator circuitry 20 (often memory mapped) may be associated with one of the execution pipelines 18 and serve to execute particular long latency workloads, such as cryptographic algorithms, deep-packet inspection, regular expression matching, vision algorithms, etc. In some embodiments co-processor(s) may be used to undertake specific workloads with instructions to communicate with main pipeline(s). Another example of long latency workloads are system instructions executed by a system block 23, such reads/writes to units such as interrupt controllers or cache maintenance operations.

Data values to be manipulated are stored within a hierarchical memory which in this example embodiment is formed of a level 1 cache 22, a level 2 cache 24 and a main memory 26. If a data value to be accessed is present within the level 1 cache 22, then it is accessed therefrom. If a data value to be accessed is not present within the level 1 cache 22, then a level one cache miss arises and a lookup is made within the level 2 cache 24. If a level two cache miss occurs then an access to the main memory 26, such as double data rate (DDR) memory, is required. The level 2 cache 24 has a greater access latency than is associated with the level 1 cache 22. The main memory 26 has a greater access latency than the level 2 cache 24. A level 1 cache miss will incur a number of cycles of addition delay in the access operation such as x cycles of delay. If a miss occurs for the data access within the level 2 cache 24, then an access to the data value is made to the main memory 26. This incurs a further delay in the memory access such as an additional y cycles, where typically the delay associated with a level 2 cache miss, namely y cycles, is significantly larger than the delay associated with a level 1 cache miss, namely x cycles.

Branch prediction circuitry 28 serves to snoop memory addresses instructions being fetched from the instruction cache 4 by the fetch stage 6 and to identify predicted taken branches within the program flow of individual threads. When predicted taken branches are identified, then the program flow is redirected to follow the predicted taken branch. If a branch misprediction occurs, then the incorrect program instructions for a thread will have been supplied into the processing pipeline of the data processing apparatus 2 and will require flushing from the processing pipeline, under control of flush control circuitry 30. Flush operations may also occur for reasons, such as exceptions or interrupts. Furthermore, it may be desirable to perform a flush operation even when the correct program instructions are present within the pipeline such as when a cache miss incurring a significant access latency occurs or when detection of the execution of a long latency instruction (such as a division or square root instruction by the accelerator 20) occurs. In these circumstances, the delay associated with the long latency memory access or long latency instruction will result in the stalling of program instructions behind the long latency event until it has completed. A result of this stalling is that the processing resources of the data processing apparatus 2 containing the stall program instructions (processing operations) are unused while the stall persists. This is inefficient.

In order to address this inefficiency, the flush control circuitry 30 serves to identify when long latency events arise within a thread and to perform a flush operation in respect of that thread to release processing resources for use by other threads until the long latency operation has completed and the stalled thread restarted. The flush control circuitry 30 performs multiple types of flush operations (such as two types, although other numbers are possible) in dependence upon the type of flush trigger which has been detected. In the example illustrated, a miss within the level 1 cache 22 is a first type of flush trigger and results in a first type of flush operation. A miss within the level 2 cache 24 corresponds to a longer latency delay and is a second type of flush trigger resulting in a second type of flush operation. When a long latency instruction is sent by the execution pipeline 18 to the accelerator circuitry 20 for execution, then this corresponds to a first type of flush trigger and results in the first type of flush operation.

The first type of flush operation and the second type of flush operation differ in how much state they flush (remove) from the data processing apparatus 2 for the thread which has stalled. The remaining threads are not stalled and continue to be processed. Indeed, the not-stalled threads can be processed more rapidly as the processing resources within the pipeline freed by the flush are then available for these un-stalled threads. In the example illustrated in FIG. 1, the first type of flush operation flushes state for the stalled thread from those processing stages marked with an "*", namely the execution pipelines 16, 18, the issue stage 14 and the decode stage 12. The instruction queue 10 is not flushed in this example embodiment and stores a queue of instruction data (e.g. raw instructions, partially decoded instructions, micro operations etc.) from all of the threads. Processing has been performed in respect of the instruction data for the stalled thread which is present within the instruction queue 10, such as the processing associated with fetching the instructions from the instruction cache 4, performing branch prediction upon those instructions, and pre-processing those instructions by the pre-processing stage 8 (e.g. partial decoding transformation to micro operations etc). If the instructions for the stalled thread are flushed from the instruction queue 10, then the energy consumed in the activity upstream of the instruction queue 10 for those flushed instructions is wasted. If the instruction queue 10 has sufficient capacity to continue to supply instruction data for the non-stalled threads whilst still retaining the instruction data for the stalled thread, then the energy in processing the instruction data for the stalled thread present within the instruction queue 10 will not be wasted and the instruction for the stalled thread retained within the instruction queue 10 can be used when the stalled thread recommences execution, such as when the data which resulted in the cache miss has been returned or the long latency instruction has completed its execution.

When a cache miss occurs within the level 2 cache 24, then this will result in an access latency which is greater than that associated with a miss in the level 1 cache memory 22. In this circumstance a second type of flush operation will be triggered. Thus, a miss within the level 2 cache 24 corresponds to a second type of flush trigger. The second type of flush operation performed by the flush control circuitry 30 serves to flush all of the stages which were flushed during the first type of flush operation and additionally flush the instruction queue 10, the pre-processing stage 8, and the fetch stage 6 in respect of the stalled thread (as marked "#" in FIG. 1). This frees the processing resource within these additionally flushed stages 6, 8, 10 and enables these resources to be available for the un-stalled thread thereby permitting execution of the un-stalled threads to proceed more readily, e.g. not be starved of resources by the fetch stage, the pre-processing stage or the instruction queue 10.

Other example embodiments (not illustrated) may have a memory hierarchy formed of level 1 (L1), level 2 (L2) and level 3 (L3) caches followed by a DDR memory. The L1 and L2 caches may operate under the same first type of flush trigger with an L2 cache miss followed by a fetch to the L3 cache or DDR memory corresponding to the second type of flush trigger.

Thus, viewed in one manner, when a first type of flush trigger arises, then the processing apparatus 2 is flushed back to a first flush point corresponding to the instruction queue 10. When a second type of flush trigger arises, then the processing apparatus 2 is flushed back to a second flush point corresponding to the instruction cache 4. A flush is performed in respect of the particular thread which has stalled with the data associated with the other un-stalled threads not being flushed. A first type of flush trigger can arise in this example embodiment, either by a miss within the level 1 cache 22 or the detection of the use of the accelerator circuitry 20 to execute a long latency instruction. Other types of flush trigger are also possible. Furthermore, the example illustrated in FIG. 1 has two types of flush operation and two flush points. In other embodiments, it is possible that more than two types of flush operation may be utilised and more than two flush points provided. The extent of the flushing performed and the particular portions of the circuitry from which data for the stalled thread are flushed may be selected in dependence upon the type of the flush trigger that arises.

In the example of FIG. 1, the state which is flushed for the first type of flush operation is a proper subset of the state which is flushed for the second type of flush operation. In other embodiments, this relationship need not be the case. The state which is flushed as described in relation to FIG. 1 is instruction data specifying processing operations to be performed, such as raw instructions as fetched from the instruction cache 4, or partially or fully decoded instructions (e.g. micro operations). The instruction queue 10 in FIG. 1 may in some embodiments be considered to serve as a micro operation cache, or a trace cache depending, upon the form of the overall processing apparatus 2 and the action of the pre-processing stage 8.

Figure 2:
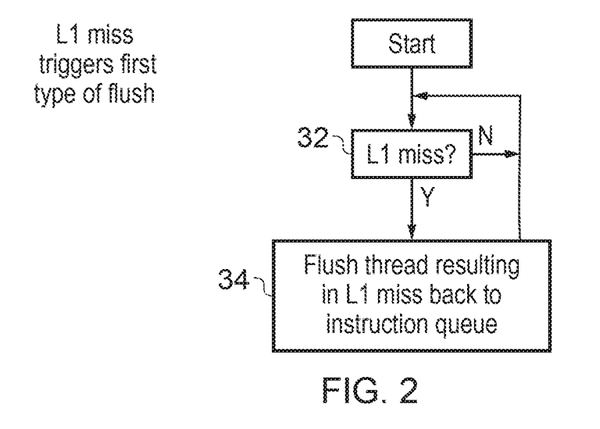
FIG. 2 is a flow diagram schematically illustrating how a level 1 cache miss triggers a first type of flush.

FIG. 2 is a flow diagram schematically illustrating how a level 1 cache miss triggers a first type of flush operation. At step 32, the flush control circuitry 30 waits until a level 1 cache miss is detected. When a level 1 cache miss is detected, then step 34 serves to perform a flush operation of a first type which results in the pipeline being flushed back as far as the instruction queue 10 (the first flush point) in respect of the instruction data (instructions, micro operations, partially decoded instructions) etc. of the thread which resulted in the level 1 cache miss. Instruction data for other threads is not flushed.

Figure 3:
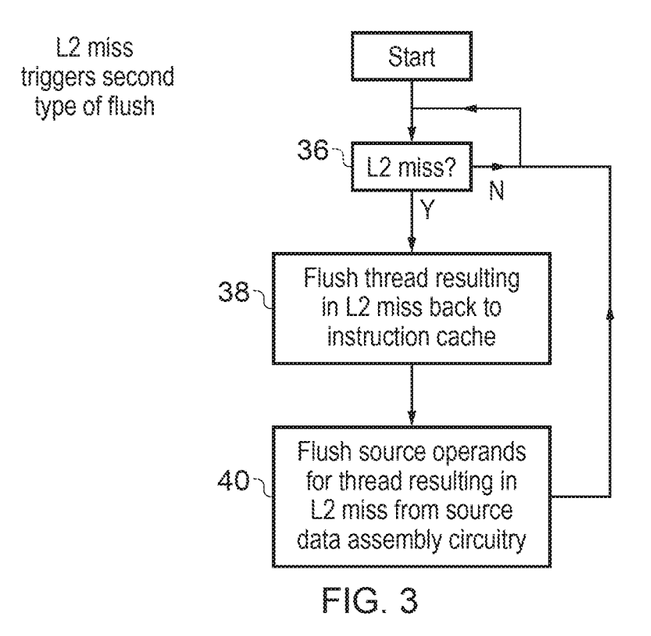
FIG. 3 is a flow diagram schematically illustrating how a level 2 cache miss triggers a second type of flush.

FIG. 3 is a flow diagram schematically illustrating how a level 2 cache miss triggers a second type of flush. At step 36 the flush controller waits until a level 2 cache miss is detected. Step 38 then flushes the pipeline of instruction data corresponding to the stalled thread back as far as the instruction cache 4, which represents the second flush point illustrated in FIG. 1. Instruction data for other threads is not flushed.

In some embodiments, state in addition to instruction data may also be flushed by the flush operations. In the example of FIG. 3, this is represented by step 40 which serves to flush source operands which have been stored (collected) in respect of instructions for the stalled thread prior to execution of those instructions. This behaviour is illustrated further in FIG. 5.

Figure 4:
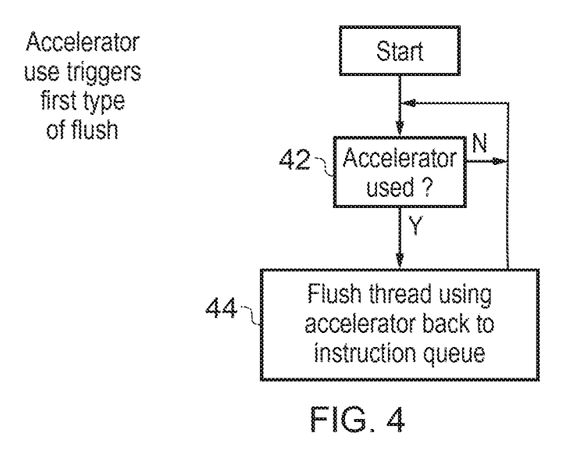
FIG. 4 schematically illustrates how use of an accelerator triggers a first type of flush.

FIG. 4 is a flow diagram illustrating how use of an accelerator 20 triggers a first type of flush. At step 42, the flush controller circuitry 30 waits until detection of the use of the accelerator 20, e.g. a long latency workload such as, performing a cryptographic process, is sent by the execution pipeline 18 to the accelerator 20 for execution (e.g. by a read/write to an address memory mapped to the accelerator 20). Another example of a long latency instructions in other embodiment is a coprocessor register access instruction. When the use of the accelerator is detected at step 42, then the flush control circuitry 30 serves to perform a flush of the first type in respect of the thread which includes the long latency instruction back as far as the instruction queue 10 (first flush point) using step 44.

Figure 5:
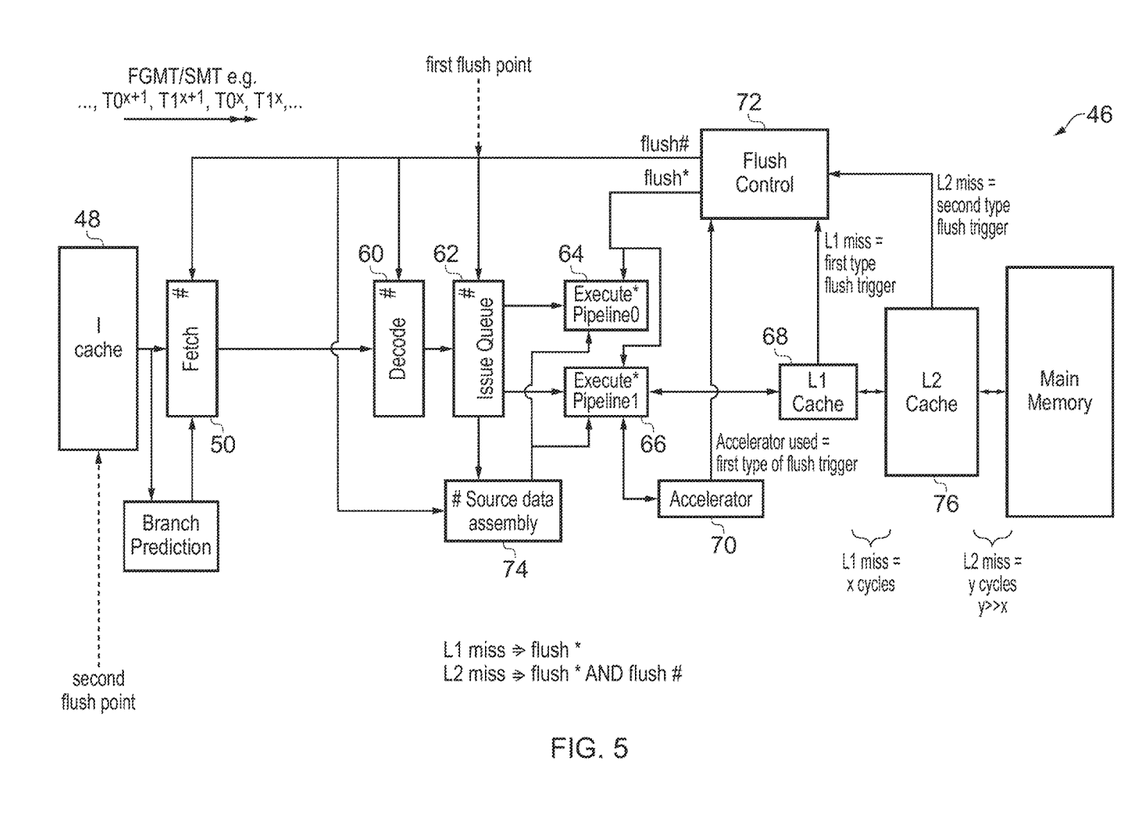
FIG. 5 schematically illustrates a second example processing pipeline.

FIG. 5 schematically illustrates a second example embodiment. The data processing apparatus 46 of FIG. 5 illustrates a pipeline including an instruction cache 48, a fetch stage 50, a decode stage 60, an issue queue 62 and parallel execution pipelines 64, 66. The issue queue 62 in this example embodiment serves to store fully decoded instruction data. The issue queue 62 is the first flush point to which state data for the old thread is flushed in response to a first type of flush trigger. The first type of flush trigger can again arise due to a miss within the level 1 cache memory 68 or the use of an accelerator 70 to execute a long latency operation. The flush control circuitry 72 in this example embodiment additionally flushes state data corresponding to source data to be used for instructions that are to be executed as is assembled by source data assembly circuitry 74 in response to observation of the decoded instructions present within the issue queue 62. The first type of flush operation which is associated with the first type of flush trigger serves to flush back as far as the issue queue 62, but does not flush the data within the issue queue 62, the source data assembly circuitry 64, the decode stage 60 or the fetch stage 50. The second type of flush trigger arising from a miss within a level 2 cache memory 76 serves to trigger a second type of flush operation, which in this case in addition to flushing the execution pipelines 64, 66, also flushes the source assembly data circuitry 74, the issue queue 62, the decode stage 60 and the fetch stage 50 in respect of the stalled thread. The state (instructions and data to be manipulated) in respect of un-stalled threads is not flushed.

It will be appreciated that the present technique relates to multi threaded processors in which processing operations in respect of different threads are performed in parallel, e.g. the processing pipeline includes instructions from multiple threads at different points within the pipeline. Multiple different types of flush triggers are possible. These flush triggers may have different latencies associated with them. The different flush triggers may also be associated differences other than latencies, e.g. they may be characterised by the particular portions of the pipeline in which they arise. The different types of flush trigger result in different sets of state (whether that be instruction specifying state, data specifying state, control specifying state or other state) being flushed in respect of the thread which resulted in the trigger. The flush trigger may correspond to a stalling of a thread or another action, such as the aborting of a particular thread or an exception arising in respect of a particular thread.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

I claim:

1. Apparatus for processing data comprising:
   processing circuitry to execute in parallel processing operations corresponding to a plurality of threads of processing operations; and
   flush control circuitry responsive to detection of a flush trigger for a given processing thread among said plurality of threads to control flushing of state for said given thread from said processing circuitry; and
   a hierarchical memory having a plurality of memory levels,
   wherein:
   a first type of flush trigger corresponds to an access to a first memory level within said plurality of memory levels;
   a second type of flush trigger corresponds to an access to a second memory level within said plurality of memory levels and different from said first memory level;
   when said flush trigger is said first type of flush trigger, said state is a first set of state; and
   when said flush trigger is said second type of flush trigger, said state is a second set of state different from said first set of state.

2. Apparatus as claimed in claim 1, wherein said first set of state is a proper subset of said second set of state.

3. Apparatus as claimed in claim 1, wherein said flushing of state for said given processing thread permits said processing circuitry to process additional processing operations of one or more other threads among said plurality of thread and different from said given thread.

4. Apparatus as claimed in claim 1, wherein said hierarchical memory comprises first level cache memory, second level cache memory and further memory, said first type of flush trigger corresponds to a miss within said first level cache memory resulting in an access to said second level of cache memory and said second type of flush trigger corresponds to a miss within said second level cache memory resulting in an access to said further memory.

5. Apparatus as claimed in claim 1, wherein said first level memory has a first access latency, said second level memory has a second access latency, said first access latency being less than said second access latency.

6. Apparatus as claimed in claim 1, wherein said processing circuitry comprises first instruction storage circuitry to store first instruction data for said given thread and second instruction storage circuitry to store second instruction data for said given thread and corresponding to first instruction data for said given thread read from said first instruction storage circuitry, said second set of state includes said second instruction data and said first set of state excludes said second instruction data.

7. Apparatus as claimed in claim 6, wherein said first instruction storage circuitry comprises an instruction cache.

8. Apparatus as claimed in claim 6, wherein said second instruction storage circuitry comprises instruction queue circuitry to store instruction data fetched following program flow within said plurality of threads.

9. Apparatus as claimed in claim 8, wherein said second type of flush trigger for said given thread triggers flushing of instruction data for said given thread from said instruction queue and said first type of flush trigger for said given thread triggers leaves instruction data for said given thread stored in said instruction queue.

10. Apparatus as claimed in claim 6, comprising branch prediction circuitry to predict program flow within said plurality of treads and wherein said second instruction data is stored in said second instruction storage in dependence upon branch prediction operations performed by said branch prediction circuitry.

11. Apparatus as claimed in claim 6, wherein comprising instruction pre-processing circuitry to perform one or more pre-processing operations upon said first instruction data read from said first instruction storage circuitry to form said second instruction data to be stored within said second instruction storage circuitry.

12. Apparatus as claimed in claim 1, wherein said processing circuitry comprises at least one execution pipeline, said first set of state and said second set of state both including pipeline state data corresponding to partial execution of processing operations of said given thread by said one or more processing pipelines.

13. Apparatus as claimed claim 1, wherein said processing circuitry is out-of-order processing circuitry to control execution of processing operations in an order other than following a program flow order and said flushing of state corresponding to state in respect of processing operations following a given flush triggering instruction within said program flow order with instructions preceding said given flushing triggering instruction within said program flow order permitted to complete.

14. Apparatus as claimed in claim 1, wherein said processing circuitry is in-order processing circuitry to control execution of processing operations in an order following a program flow order and said flushing of state corresponding to state in respect of processing operations following a given flush triggering instruction within said program flow order with instructions preceding said given flushing triggering instruction within said program flow order permitted to complete.

15. Apparatus as claimed in claim 1, wherein said first type of flush trigger corresponds to detection of execution of a long-latency processing operation associated with a long execution latency.

16. Apparatus as claimed in claim 15, wherein said long-latency processing operation is one of:
   an operation processed by an accelerator;
   an operation processed by a co-processor;
   a system instruction; and
   a long latency instruction.

17. Apparatus for processing data, comprising:
   processing means for executing in parallel processing operations corresponding to a plurality of threads of processing operations; and
   flush control means, responsive to detection of a flush trigger for a given processing thread among said plurality of threads, for controlling flushing of state for said given thread from said processing circuitry; and
   a hierarchical memory means having a plurality of memory levels,
   wherein:
   a first type of flush trigger corresponds to an access to a first memory level within said plurality of memory levels;
   a second type of flush trigger corresponds to an access to a second memory level within said plurality of memory levels and different from said first memory level;
   when said flush trigger is said first type of flush trigger, said state is a first set of state; and
   when said flush trigger is said second type of flush trigger, said state is a second set of state different from said first set of state.

18. A method of processing data comprising:
- executing in parallel processing operations corresponding to a plurality of threads of processing operations; and
- in response to detection of a flush trigger for a given processing thread among said plurality of threads, controlling flushing of state for said given thread from said processing circuitry, wherein:
- a first type of flush trigger corresponds to an access to a first memory level within a plurality of memory levels of a hierarchical memory;
- a second type of flush trigger corresponds to an access to a second memory level within said plurality of memory levels and different from said first memory level;
- when said flush trigger is said first type of flush trigger, said state is a first set of state; and
- when said flush trigger is said second type of flush trigger, said state is a second set of state different from said first set of state.

* * * * *